June 1, 1954

A. T. STARR ET AL

CRYSTAL DIODE AND TRIODE

Filed May 26, 1951

2,680,220

Inventor
A. T. STARR - C. De B. WHITE -
N. S. CINDEREY - K. A. MATTHEWS
R. B. W. COOKE
By [signature]
Attorney Patented June 1, 1954

2,680,220

UNITED STATES PATENT OFFICE 2,680,220

CRYSTAL DIODE AND TRIODE

Arthur Tisso Starr, Charles de Boismaison White, Norman Sidney Cinderey, Kenneth Albert Matthews, and Reginald Benjamin William Cooke, Aldwych, London, England, assignors to International Standard Electric Corporation, New York, N. Y.

Application May 26, 1951, Serial No. 228,486

Claims priority, application Great Britain June 9, 1950

2 Claims. (Cl. 317—235)

The present invention relates to electric devices employing semiconductors, including diode rectifiers, and amplifying devices of the kind which have been called "crystal triodes."

Rectifiers employing semiconducting materials may be divided broadly into two classes, namely those employing semiconducting crystals such as germanium, silicon or lead sulphide, in which a sharply pointed wire or catswhisker, making substantially a point contact with the crystal, is used as the rectifying electrode; and those employing materials such as selenium or copper oxide in which a counter electrode of large area must be used to provide the rectifying contact. The present invention concerns only devices employing semiconductors of the first type, which for convenience will be called semiconductors of the "point contact type" in this specification.

It is known to mount a crystal of germanium or other semiconductor of the point contact type in a metal base or holder with which it makes contact over a relatively large area, and to provide it with two sharply pointed fine wire electrodes or catswhiskers making contact close together with the surface of the crystal. Then, provided that the surface of the crystal is suitably treated, the device (which has been called a "crystal triode") can be operated as an amplifier in which one of the catswhisker electrodes (called the emitter electrode) is an input electrode and the other (called the collector electrode) is an output electrode.

If the crystal triode is required to give a current gain, a suitable electroforming process such as that described in the specification of copending application to D. A. Matthews-C. de B. White 1-4, Serial No. 150,412, filed March 18, 1950, now Patent No. 2,653,374, entitled Electric Semi-Conductors, should also be applied.

The use of catswhiskers as electrodes is not altogether satisfactory because of the uncertainty of the contacts with the crystal, and of the liability of the catswhiskers to shift their positions when the device is subjected to vibration or shock in normal use. Hitherto, it has been considered essential that for the device to operate as desired, the emitter and collector electrodes should make substantially point contact with the crystal.

The present invention is based on the discovery by the applicants that under proper conditions, point contacts are not essential for a rectifier or a crystal triode, and that the catswhisker electrode may be replaced by an electrode of appreciable area, which is formed by depositing on the crystal surface in some suitable manner a metal film to which a conductor wire may be soldered or otherwise firmly attached.

The invention accordingly provides an electric signal translating device comprising a body of semiconducting material of the point contact type, a base electrode in contact with the said body, and one or more additional electrodes making rectifying contact with the surface of the said body, the said additional electrodes, or at least one of them, consisting of a metal film deposited on the said surface.

The invention also provides an electric signal translating device comprising a body of semiconducting material of the point contact type, a base electrode in contact with the said body, and a second electrode making rectifying contact with the surface of the semiconducting material over an appreciable area.

In the above statement, "appreciable area" means an area not less than $10^{-4}$ square millimetre, and not greater than one square millimetre.

If a crystal triode is required to give a current gain, it is necessary that the crystal surface to which the collector electrode is applied should contain a suitable donor impurity if the crystal is of N-type material, or an acceptor impurity if it is of P-type material. This condition may be produced by employing for the collector electrode a metal containing the appropriate impurity, and then injecting the impurity into the germanium surface by means of the electroforming process already referred to. When metal film electrodes are used this result may be attained in two ways. First, the material of the electrodes deposited on the surface of the crystal according to this invention may have added to it a small amount of the appropriate impurity, and then the electroforming process is applied using the deposited electrodes instead of point contact electrodes referred to in the specification of application No. 150,412. Alternatively, if the material of the deposited electrodes does not contain the necessary impurity, the area of the crystal surface may be electroformed with the help of a pair of temporary catswhisker electrodes containing the necessary impurity, after which the film electrodes are deposited on the electroformed surface.

Before depositing the electrodes on the crystal surface, and before applying the electro-forming process, the surface should be given the usual preliminary treatment for developing good rectifying properties, and should preferably be highly polished.

One method for depositing the electrodes on the germanium crystal comprises coating the crystal with suitably prepared gelatine and photographing thereon an image of the electrodes, so that after development a stencil is formed, through which the electrodes may be electroplated on to the surface of the crystal. A suitable plating metal is copper, which may be deposited from a bath containing preferably an arsenic compound in solution (in the case where an N-type crystal is employed), whereby the deposited electrodes will contain a small quantity of arsenic. Another suitable impurity for N-type material is phosphorus.

The electrodes may be deposited also by evaporation in vacuo.

In the specification of application No. 174,692, filed July 19, 1950, to C. de B. White-D. A. Matthews-E. M. Rawlinson, entitled Crystal Triodes it is pointed out that considerable advantages may be obtained by the use of gold as the electrode material. According to the present invention, thin films of gold may be plated or evaporated on to the crystal surface to serve as the electrodes.

Electrodes of appreciable area deposited on the crystal surface according to the invention may be applied also to diodes, or to crystal triodes with more than three electrodes.

Since a crystal triode is applicable as a modulator as well as an amplifier, and may be used in various ways for transforming or translating electric signals, it may conveniently be referred to as a "translating device," which term also includes rectifiers with only two electrodes.

In a crystal triode, the emitter and collector electrodes both make rectifying contact with the crystal surface, but the collector electrode, which is biased in the high resistance direction, is rather more sensitive to the production of appropriate rectifying properties than the emitter electrode, which is biased in the low resistance direction.

A short discussion of the properties of crystal rectifiers in which the normal catswhisker electrode is replaced by a metal film of small area will therefore be given.

It has been found, generally, that when the contact area of the rectifying electrode is increased, the forward resistance decreases, but so also does the reverse resistance by a rather larger factor, so that the rectification ratio decreases. It is of course assumed in the above statement that the forward and reverse currents are always respectively measured under the same conditions for different contact areas. The "turnover voltage," that is, the voltage applied in the reverse direction at which the unstable or negative resistance condition sets in, also decreases as the contact area is increased.

In order to give some idea of the magnitude of these effects, some measured results will be given for a germanium rectifier. The voltage necessary to produce a current of 5 milliamperes in the reverse or high resistance direction was found to decrease substantially linearly from 63 to 53 volts as the contact area was increased from 0.0012 to 0.006 sq. mm. In another case in which the applied voltage was 0.5 volt in each direction, the reverse current increased from 0.7 to 3.5 milliamps, while the forward current increased from 3.8 to 8.3 milliamps as the contact area increased from 0.0012 to 0.006 sq. mm. Thus the rectification ratio for 0.5 volt decreases from about 5.4 for a contact area of 0.0012 sq. mm. to about 2.4 for a contact area of 0.006 sq. mm.

Tests with areas up to 1 sq. mm. showed that an approximately linear relation between the contact area and the forward and reverse currents was maintained, provided that no bad spots (that is local non-rectifying or poorly rectifying spots) are included in the area.

Thus it will be seen that up to at least 1 square millimetre it is possible to predict the properties of the rectifier, and to choose the contact area so that desired characteristics are obtained.

In the case of a crystal triode, as already mentioned, the collector electrode is biased in the reverse or high resistance direction, and therefore a reverse resistance which is too low may be objectionable. The emitter electrode is however biased in the forward or low resistance direction and in this case a low forward resistance may be desirable. This indicates that it may be useful to have the contact area of the collector electrode smaller than that of the emitter electrode; and in certain cases it may even be convenient to retain a catswhisker for the collector electrode, while providing the emitter electrode in the form of a deposited metallic film. When an additional control electrode is provided, as described for example in the specification of application No. 152,302, filed March 23, 1950, to C. de B. White-D. A. Matthews, 6-2 Div. A, entitled Amplifiers Employing Semi-Conductors, such additional electrode may also take the form of a deposited metallic film. It will be understood that the areas of these film electrodes will be selected in accordance with the particular requirements which have to be met, on the lines explained above.

When, according to the invention, a crystal diode is provided with a rectifying electrode consisting of a metallic film of appreciable area, it is, of course, not necessary or desirable to provide a surface on the semi-conductor containing the impurity which is required in this case of a current gain crystal triode, and therefore the special electroforming process for injecting the impurity into the surface layer is not carried out. The usual surface treatment for producing the necessary rectifying properties should of course be applied.

The properties of a crystal triode or diode provided with a film electrode or electrodes of appreciable area, to which conductor wires may be securely fixed, will be practically unaffected by any reasonable handling to which the device will be subjected in use; furthermore by the use of suitable depositing processes the very small separation between the collector and emitter electrodes, which is necessary to develop the properties of a crystal triode, can be obtained much more cheaply and certainly than by placing two fine pointed wires on the crystal surface by hand.

It should be understood that according to the invention, a crystal triode may employ one or more catswhisker electrodes in addition to one or more electrodes of appreciable area, in cases where some special condition has to be fulfilled.

A cheap and convenient design for a crystal diode or triode according to the invention will be described with reference to the drawing in which.

Figure 1:
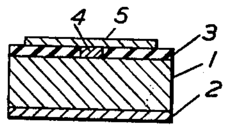
Fig. 1 shows a sectional view of a crystal diode.
Figure 2:
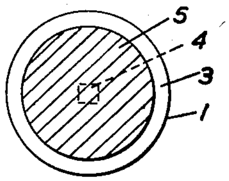
Fig. 2 shows a top plan view of the diode.

The crystal diode shown in Figs. 1 and 2 comprises a disc or wafer 1 of germanium or other semi-conductor of the point contact type, having a base electrode 2 consisting of a silver or other metal film plated or otherwise deposited over the whole or a large part of the underside area forming therewith a low resistance non-rectifying contact. On the upper face of the disc is applied a thin insulating film 3 having a small hole 4 therein shown dotted in Fig. 2, through which the surface of the crystal 1 is exposed. The hole 4 could be square as shown, or circular, or any other shape, and should have an area within the limits stated above. The insulating film 3 could be of the type known as a "resist" applied by a photogravure or other similar technique.

A metal electrode is plated on the surface of the crystal through the hole 4, and it should be about the same thickness as the film 3. A silver or other metal film 5 is deposited by evaporation or plating or in any other suitable way, on top of the insulating film 3, making good contact with the electrode occupying the hole 4, to serve as the other terminal of the rectifier. Terminal wires (not shown), may, if desired, be soldered to the films 2 and 5, or alternatively, a suitable spring holder (not shown) may be designed, into which the assembly illustrated in Figs. 1 and 2 may be slipped, the holder having contact springs which are arranged to make contact with the electrodes 2 and 5.

It will be seen that a germanium rectifier can in this way be produced which is externally quite similar to the conventional selenium or copper oxide rectifier discs, and has no objectionable catswhiskers. A number of these germanium units can be conveniently arranged in a pile in a cylindrical holder and can be provided with terminal washers in the same way as piles of selenium and copper oxide rectifiers, and arranged, for example, as bridge rectifiers or ring modulators.

The characteristics of the rectifier can be varied within wide limits by varying the area of the small electrode and by the method and type of plating employed.

Figure 3:
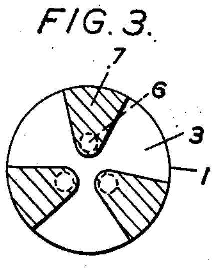
Fig. 3 shows a top plan view of a crystal amplifier with three electrodes on the upper surface.

Fig. 3 shows how the arrangements could be modified for a crystal triode or amplifier with two or more electrodes besides the base electrode. In this case the insulating film 3 is provided with two or more circular or other shaped holes 6 spaced apart in any suitable manner, and a metal electrode is plated through each of them on the surface of the semi-conductor. A sector-shaped contact film 7 is deposited on the insulating film 3 over the electrode in each hole, the two or more sector-shaped films being insulated from one another.

Assuming that N-type germanium will be used for the crystal triode, the preferred plating process comprises first etching the surface of the germanium crystal with an alkaline etching solution, and then plating the electrodes on the surface using an alkaline copper plating solution containing a small quantity of arsenic to serve as the necessary donor impurity. If P-type germanium is used, an acceptor type impurity such as aluminum or boron should be employed. The electroforming process already referred to should afterwards be carried out between the emitter and collector electrodes.

Although Fig. 3 shows three electrodes on the top surface of the semi-conductor, it will be understood that there may be any number. The disc 1 will, of course, be provided with a base electrode (not shown in Fig. 3) similar to 2, Fig. 1. As in the case of Fig. 1, separate wires (not shown) may be soldered to the sectors 7, or a suitable holder with springs designed to make contact with the sectors 7 and base 2 may be provided, into which the device may be slipped.

The device described with reference to Fig. 2 or 3 may be kept cool if necessary, by mounting it with the base electrode in contact with a thick brass or copper plate.

Figure 4:
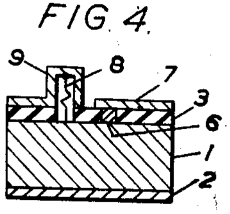
Fig. 4 shows a sectional view of a modification of Fig. 3.

Fig. 4 shows in section a modification of the crystal triode shown in Fig. 3, in which one of the electrodes is replaced by a catswhisker of the conventional type. One of the holes 6 in the insulating layer 3 is shown occupied by a plated-on electrode and covered by a contact film 7, as shown in Fig. 3, but the other hole is left open and through it projects a catswhisker 8 making point contact with the surface of the crystal 1. The catswhisker is mounted in a suitable metal holder 9 fixed in some convenient way to the insulating film 3. Terminal wires may be soldered to the contact film 7 and to the holder 9, if desired.

While the principles of the invention have been described above in connection with specific embodiments, and particular modifications thereof, it is to be clearly understood that this description is made only by way of example and not as a limitation on the scope of the invention.

What we claim is:

1. An electric amplifying device of the point contact type comprising a disc of semiconducting material having deposited over one face a metal film to serve as a base electrode, and on the other face a film of insulating material having a hole therein, a metal film electrode of area not less than $10^{-4}$ square millimeter and not greater than 1 square millimeter deposited on the surface of the disc and occupying said hole, a metal film terminal of extended area deposited on the insulating film and making contact with the film electrode, and a catswhisker electrode making substantially point contact with the surface of the semiconducting material.

2. An electric amplifying device of the point contact type comprising a disc of semi-conducting material having a metal film deposited over one face to serve as a base electrode, and a film of insulating material deposited over the other face and having therein a plurality of holes each of area not less than $10^{-4}$ square millimeter and not greater than 1 square millimeter, a plurality of metal film electrodes deposited on the surface of the disc and respectively occupying said holes, an additional electrode making substantially point contact with the surface of the semi-conducting material through a corresponding hole, and a plurality of metal film terminals of extended area each of which is deposited on the insulating film and makes electrical contact with a corresponding film electrode, all said terminals being electrically insulated from one another.

References Cited in the file of this patent

UNITED STATES PATENTS

| Number | Name | Date |
|---|---|---|
| 2,314,104 | Richards et al. | Mar. 16, 1943 |
| 2,359,801 | Skinker | Oct. 10, 1944 |
| 2,369,185 | Skinker | Feb. 13, 1945 |
| 2,434,967 | Skinker et al. | Jan. 27, 1948 |
| 2,444,385 | Thompson | June 29, 1948 |
| 2,495,716 | Girard | Jan. 31, 1950 |
| 2,524,033 | Bardeen | Oct. 3, 1950 |
| 2,524,035 | Bardeen et al. | Oct. 3, 1950 |